(12) United States Patent
Schonlau et al.

(10) Patent No.: US 9,435,385 B2
(45) Date of Patent: Sep. 6, 2016

(54) DEVICE WHICH IS OPERATED BY AN ELECTROMAGNET AND HAS AN ENCAPSULATED THREADED CONNECTION

(71) Applicant: Thomas Magnete GmbH, Herdorf (DE)

(72) Inventors: Juergen Schonlau, Daaden (DE); Benjamin Ginsberg, Liebenscheid (DE); Markus Ermert, Burbach (DE); Marc Leinweber, Neunkirchen (DE)

(73) Assignee: Thomas Magnete GmbH, Herdorf (DE)

( * ) Notice: Subject to any disclaimer, the term of this patent is extended or adjusted under 35 U.S.C. 154(b) by 0 days.

(21) Appl. No.: 14/763,693

(22) PCT Filed: Jan. 24, 2014

(86) PCT No.: PCT/EP2014/000183
§ 371 (c)(1),
(2) Date: Jul. 27, 2015

(87) PCT Pub. No.: WO2014/114457
PCT Pub. Date: Jul. 31, 2014

(65) Prior Publication Data
US 2015/0369304 A1    Dec. 24, 2015

(30) Foreign Application Priority Data

Jan. 28, 2013 (DE) .......... 10 2013 001 425

(51) Int. Cl.
| | |
|---|---|
| *H01F 7/06* | (2006.01) |
| *F16D 27/14* | (2006.01) |
| *H01F 7/127* | (2006.01) |
| *H01F 7/128* | (2006.01) |

(52) U.S. Cl.
CPC ........... *F16D 27/14* (2013.01); *H01F 7/06* (2013.01); *H01F 7/127* (2013.01); *H01F 7/128* (2013.01)

(58) Field of Classification Search
CPC ....................................................... H01F 7/128
USPC ............................................................. 335/260
See application file for complete search history.

(56) References Cited

U.S. PATENT DOCUMENTS

| | | |
|---|---|---|
| 395,347 A | 1/1889 | Wainwright |
| 6,367,434 B1 | 4/2002 | Steigerwald et al. |

(Continued)

FOREIGN PATENT DOCUMENTS

| | | |
|---|---|---|
| DE | 19956160 A1 | 5/2001 |
| DE | 10106429 A1 | 8/2002 |

(Continued)

OTHER PUBLICATIONS

International Search Report for PCT/EP2014/000183, ISA/EP, mailed Jun. 10, 2014.

*Primary Examiner* — Ramon M Barrera
(74) *Attorney, Agent, or Firm* — Harness, Dickey & Pierce, P.L.C.

(57) ABSTRACT

Object: Device comprising an electromagnet (1) and an actuating element (2) which is operated by said electromagnet and may be, for example, a valve or a clutch, wherein said components are connected to one another by means of threads (4) and (5), with protection of functional spaces in the components or of elastomeric seals against damage and adverse effects on functioning by particles from the threads. Solution: The electromagnet-side thread (4) and actuating element-side thread (5) are axially adjacent in both directions of chambers (6) and (7) which are closed off on in each case the side which is averted from the threads by overlapping cylinder surfaces (11) and (12) on one side and also by further overlapping cylinder surfaces (13) and (14) on the other side.
Application: Actuating elements which are operated by an electromagnet.

8 Claims, 2 Drawing Sheets

(56) References Cited

U.S. PATENT DOCUMENTS

2010/0301244 A1 12/2010 Gruen et al.
2011/0063056 A1 3/2011 Lesk
2011/0102115 A1 5/2011 Lesk
2011/0168933 A1 7/2011 Shimizu

FOREIGN PATENT DOCUMENTS

| DE | 102006014020 A1 | 7/2007 |
| DE | 102009050564 A1 | 4/2011 |
| EP | 2299457 A2 | 3/2011 |
| EP | 2325851 A1 | 5/2011 |
| EP | 2535626 A1 | 12/2012 |
| WO | WO-2009/071069 A1 | 6/2009 |

DEVICE WHICH IS OPERATED BY AN ELECTROMAGNET AND HAS AN ENCAPSULATED THREADED CONNECTION

CROSS-REFERENCE TO RELATED APPLICATIONS

This application is a 371 U.S. National Stage of International Application No. PCT/EP2014/000183, filed Jan. 24, 2014. This application claims the benefit of and priority to German Patent Application No. 10 2013 001 425.5, filed Jan. 28, 2013. The disclosures of the above applications are incorporated herein by reference.

FIELD

The disclosure relates to a device which is operated by an electromagnet.

BACKGROUND

This section provides background information related to the present disclosure which is not necessarily prior art.

Electromagnets for operating clutches, valves or other actuating elements have been known for many years and are very common. In this case, two different designs are customary in respect of the interface between the electromagnet and the actuating element; in a first design, both components are permanently connected to one another because they contain a common part or several common parts. A common part is usually the pole of the electromagnet.

In a second design, the components are joined and fastened to one another either by caulking or screwing.

Screw-connection provides many advantages, but has the disadvantage that, during the screw-connection process, particles become detached from the threads, it being possible for said particles to enter the functional hollow spaces in the components and there to have adverse effects on functioning. If seals are located in the vicinity of the threads, the function of these seals can be adversely affected by the particles, or said seals may even be damaged.

If the actuating element is a valve, seals are generally arranged in the vicinity of the threads, and it is known that seals of this kind are damaged by particles.

Document EP 2 535 626 A1 describes a screw-connection arrangement comprising an adjacent seal which is protected against particles from the screw-connection arrangement by virtue of a close fit.

SUMMARY

This section provides a general summary of the disclosure, and is not a comprehensive disclosure of its full scope or all of its features.

The object of the present disclosure is to avoid the disadvantages and risks of elastomeric seals on both sides of the screw-connection arrangement, which disadvantages and risks arise due to particles becoming detached as a result of the screwing-in process, when using a screw-connection arrangement between the components. A further aim is also to establish better orientation of the two components in relation to one another than can be achieved by the threads alone.

The particles which become detached when one component is screwed into the other are received in chambers which are arranged circumferentially between the components on both sides in front of and behind the threads.

In the assembled state, these chambers are sealed off by very narrow gap seals, which prevent the passage of any particles of a dangerous size, on that side which is averted from the threads. Since these gap seals are static seals, they can also be designed as slight press-fits. They then serve not only for sealing-off purposes, but also for highly accurate orientation of the two components in relation to one another since the threads alone cannot orient the components in a highly accurate manner owing to the requisite play.

If the actuating element is a valve, elastomeric seals are generally required in order to seal off certain spaces from one another. A first elastomeric seal is advantageously used here in order to seal off both the coil space of the electromagnet from the first working connection of the actuating element and from the surrounding area, and also to seal off the working connection of the actuating element from the surrounding area. In this case, an actuating element-side conical surface is used in order to press the elastomeric seal against the electromagnet-side boundary of the sealing space. A second elastomeric seal advantageously seals off the armature space of the electromagnet from the coil space of the electromagnet.

Advantages:

In comparison to the embodiment of the threaded connection without the above-described chambers, the particles which become detached when the threads are screw-connected can be received here.

In comparison to an embodiment of the threaded connection without the above-described gap seals, the particles can neither penetrate the functional hollow spaces nor the elastomeric seals, or adversely affect the functioning of said functional hollow spaces or elastomeric seals, or damage said functional hollow spaces or elastomeric seals.

Application:

The embodiment according to the disclosure of the threaded connection is used in valves, clutches or other actuating elements which are operated by electromagnets, as are used in vehicles or self-propelled working machines for example.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Exemplary Embodiment

Figure 1:
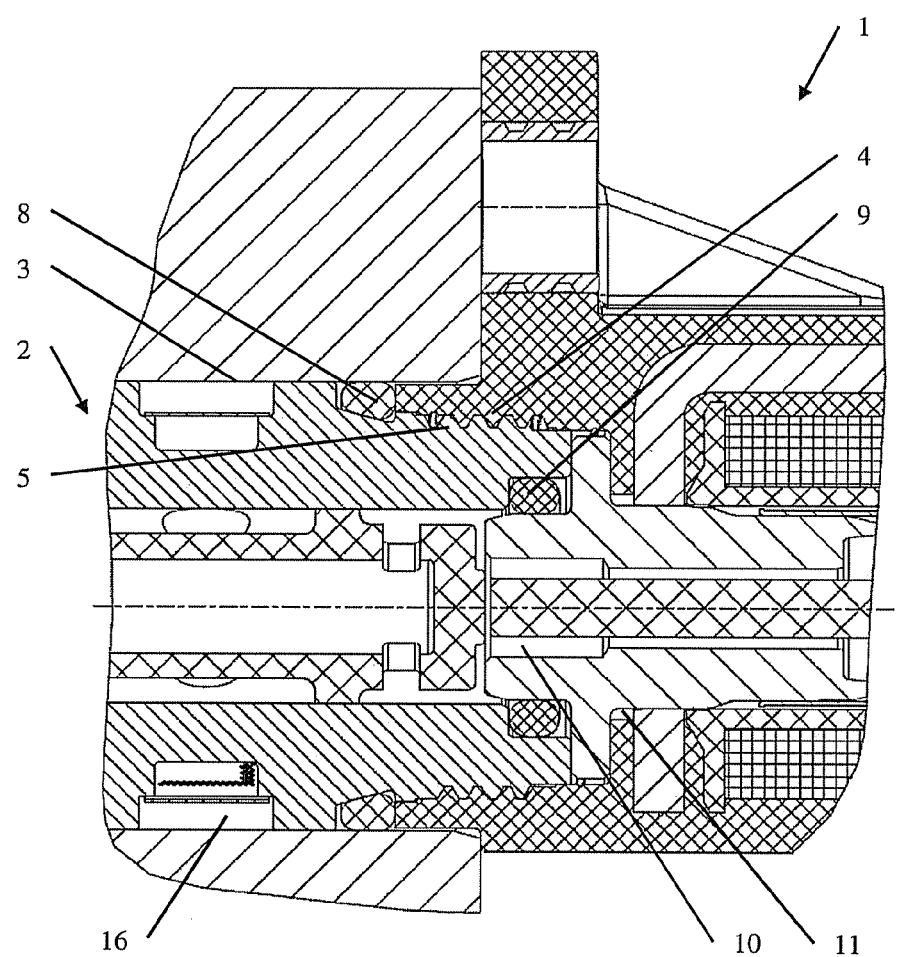
FIG. 1 shows a detail of the device according to the disclosure.
Figure 3:
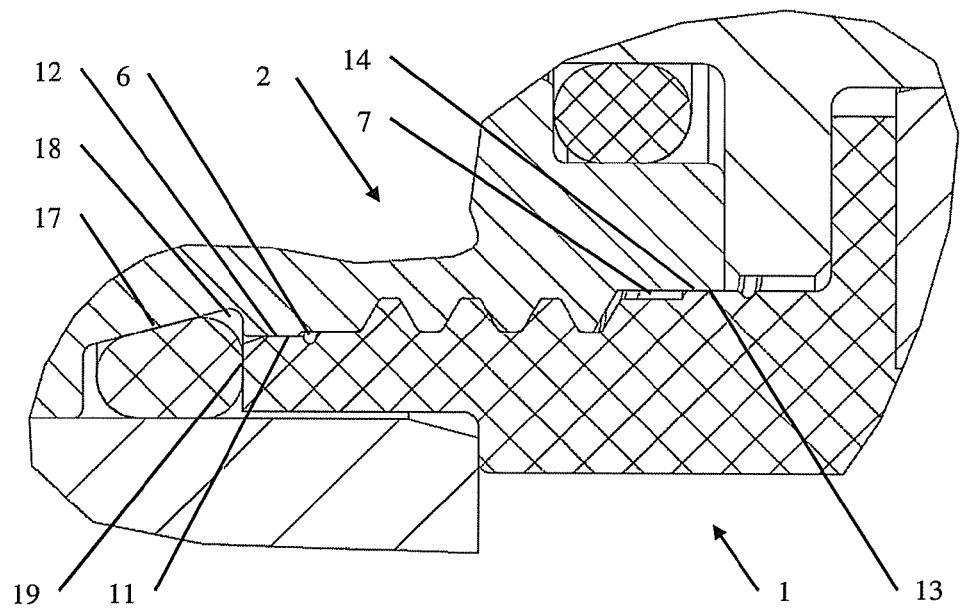
FIG. 3 shows the threaded connection in the screw-connected state.

A device according to the disclosure as per FIG. 1 comprises an electromagnet 1 and an actuating element 2 which is operated by said electromagnet and is, for example, a valve, wherein said components are connected to one another by means of threads 4 and 5 and said threads are in the vicinity of and possibly form a fluidic connection with functional spaces in the electromagnet, in the actuating element or elastomeric seals 8 and 9. The electromagnet-side thread 4 and the actuating element-side thread 5 are, as illustrated in FIG. 3, axially adjacent in both directions of chambers 6 and 7 which are closed off on the sides which are respectively averted from the threads by overlapping cylinder surfaces 11 and 12 on one side and also by further overlapping cylinder surfaces 13 and 14 on the other side. The respectively overlapping cylinder surfaces have no radial play or only a very small amount of radial play in relation to one another and also orient the electromagnet and the actuating element in a highly accurate manner in relation to one another.

The cylinder surfaces 11 and 13 are surfaces of a constituent part of the electromagnet, and the cylinder surfaces 12 and 14 are surfaces of a constituent part of the actuating element.

In interaction, the cylinder surfaces 11 and 12 on the one hand and 13 and 14 on the other form gap seals.

Figure 2:
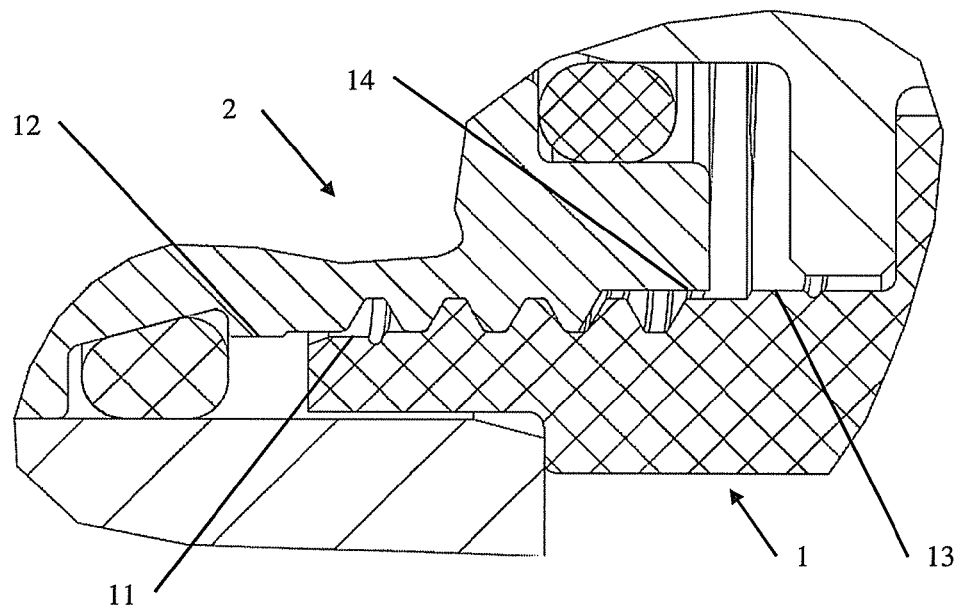
FIG. 2 shows the threaded connection in a partially screwed-in state.

During a first phase of the process of screwing the actuating element 2 into the electromagnet 1, the chambers 6 and 7, as illustrated in FIG. 2, are open toward the side which is averted from the threads, and, in a second phase of the screwing-in process, the chambers are separated off from the elastomeric seals 8, 9 or the functional spaces in the components by an overlap, which increases during the screwing-in process, between the cylinder surface 11 and the cylinder surface 12, and between the cylinder surface 13 and the cylinder surface 14.

The elastomeric seal 8 seals off the coil space 15 of the electromagnet 1 from the first working connection 16 of the actuating element 2 and from the surrounding area, and also seals off the working connection 16 from the surrounding area. In this case, an actuating element-side conical surface 17 is used to press the elastomeric seal against the electromagnet-side boundary surface 19 of the sealing space 18.

The elastomeric seal 9 seals off the armature space 10 of the electromagnet 1 from the coil space 15 of the electromagnet 1.

When two components of the device according to the disclosure are joined and fastened, the majority of the particles which become detached during the screwing-in process are received in the chambers 6 and 7 between the two components when the actuating element 2 is screwed into the electromagnet 1 by means of the actuating element-side thread 5 being screwed into the electromagnet-side thread 4. At the end of the screwing-in process, the particles which exceed a minimum value which can be defined by the gap heights are prevented from entering the installation space of the elastomeric seals 8 and 9 or the functional spaces in the components by the gap seals between the cylinder surfaces 11 and 12 on the one hand and also 13 and 14 on the other.

The foregoing description of the embodiments has been provided for purposes of illustration and description. It is not intended to be exhaustive or to limit the disclosure. Individual elements or features of a particular embodiment are generally not limited to that particular embodiment, but, where application, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SYMBOLS

1. Electromagnet
2. Actuating element
3. Installation bore
4. Magnet-side thread
5. Actuating element-side thread
6. Outer chamber
7. Inner chamber
8. Outer elastomeric seal
9. Inner elastomeric seal
10. Armature space
11. Outer magnet-side cylinder surface
12. Outer actuating element-side cylinder surface
13. Inner, magnet-side cylinder surface
14. Outer, actuating element-side cylinder surface
15. Coil space
16. Working connection of the actuating element
17. Conical surface
18. Sealing space
19. Boundary surface

The invention claimed is:

1. A device comprising:
an electromagnet and an actuating element, which is operated by said electromagnet,
wherein said electromagnet and said actuating element are connected to one another by threads, in the vicinity of and form a fluidic connection with functional spaces in the electromagnet and in the actuating element and with elastomeric seals,
wherein an elastomeric seal seals off a coil space of the electromagnet from a first working connection of the actuating element and from a surrounding area, and also seals off the first working connection from the surrounding area, and
wherein the electromagnet-side and actuating element-side threads and are axially adjacent in both directions of chambers and which are closed off on sides of the chambers which are respectively averted from the threads by overlapping first cylinder surfaces and on one side and also by further overlapping second cylinder surfaces on other side, with the respectively overlapping cylinder surfaces having no radial play or only a very small amount of radial play in relation to one another.

2. The device as claimed in claim 1, wherein, during a first phase of the process of screwing the actuating element into the electromagnet, the chambers and are open toward the side which is averted from the threads, and, in a second phase of the screwing-in process, the chambers are separated off from the elastomeric seals, or the functional spaces in the electromagnet and actuating element in the sense of a gap seal by an increasing overlap between the first cylinder surfaces, and between the second cylinder surfaces.

3. The device as claimed in claim 1, wherein an actuating element-side conical surface presses the elastomeric seal against an electromagnet-side boundary surface of a sealing space.

4. The device as claimed in claim 1, wherein the elastomeric seal seals off an armature space in the electromagnet from a coil space in the electromagnet.

5. A device comprising:
an electromagnet;
an actuating element operated by the electromagnet;
a first thread on the electromagnet;
a second thread on the actuating element, the first and second threads enable the electromagnet to be connected to the actuating element;
a first cylindrical surface on the electromagnet at a first end of the first thread and a second cylindrical surface on the electromagnet at a second end of the first thread;

a third cylindrical surface on the actuating element at a first end of the second thread and a fourth cylindrical surface on the actuating element at a second end of the second thread;
    wherein upon connecting the first thread to the second thread,
        a first chamber is formed between the first ends of the first and second theads and the first and third cylindrical surfaces, and
        a second chamber is formed between the second ends of the first and second threads and the second and fourth cylindrical surfaces,
    wherein particles that become detached during a screwing-in process are received in the first and second chambers.

6. The device of claim 5, further comprising a first elastomeric seal received in a first space between the electromagnet and the actuating element adjacent the first ends of the first and second threads.

7. The device of claim 6, further comprising a second elastomeric seal received in a second space between the electromagnet and the actuating element adjacent the second ends of the first and second threads.

8. The device of claim 7, wherein the first elastomeric seal seals off a first portion of the electromagnet from a first portion of the actuating element and the second elastomeric seal seals off a second portion of the electromagnet from a third portion of the electromagnet.

\* \* \* \* \*